United States Patent [19]

Kim et al.

[11] Patent Number: 5,793,429
[45] Date of Patent: Aug. 11, 1998

[54] METHODS OF ESTIMATING MOTION IN IMAGE DATA AND APPARATUS FOR PERFORMING SAME

[75] Inventors: Jae-Min Kim; Young-Bum Jang, both of Seoul, Rep. of Korea

[73] Assignee: Samsung Electronics Co., Ltd., Suwon, Rep. of Korea

[21] Appl. No.: 644,183

[22] Filed: May 10, 1996

[30] Foreign Application Priority Data

May 10, 1995 [KR] Rep. of Korea ............... 95-11469

[51] Int. Cl.$^6$ ................................. H04N 7/36
[52] U.S. Cl. .................... 348/416; 348/413; 382/402
[58] Field of Search .................... 348/409, 411, 348/412, 413, 415, 416, 699, 408; 382/236, 238, 240

[56] References Cited

U.S. PATENT DOCUMENTS

| | | | |
|---|---|---|---|
| 5,276,513 | 1/1994 | Van Der Wal et al. | 348/699 |
| 5,278,915 | 1/1994 | Chupeau et al. | 348/413 |
| 5,365,281 | 11/1994 | Ko et al. | 348/700 |
| 5,392,073 | 2/1995 | Jeong | 348/413 |
| 5,410,358 | 4/1995 | Shackleton et al. | 348/699 |
| 5,436,665 | 7/1995 | Ueno et al. | 348/413 |
| 5,467,086 | 11/1995 | Jeong | 341/50 |
| 5,489,949 | 2/1996 | Jeong et al. | 348/699 |
| 5,493,344 | 2/1996 | Yu | 348/699 |
| 5,497,153 | 3/1996 | Jeong | 341/67 |
| 5,508,745 | 4/1996 | Jo | 348/419 |
| 5,510,857 | 4/1996 | Kopet et al. | 348/699 |
| 5,576,772 | 11/1996 | Kondo | 348/413 |

OTHER PUBLICATIONS

Jaemin Kim, *3–D Kalman Filter For Video And Motion Estimation*, A Thesis Submitted to the Graduate Faculty of Rensselaer Polytechnic Institute in Partial Fulfillment of the Requirements for the Degree of Doctor of Philosophy. Major Subject: Electrical Engineering, Aug. 1994, pp. 1–160.

*Primary Examiner*—Amelia Au
*Attorney, Agent, or Firm*—Myers Bigel Sibley & Sajovec

[57] ABSTRACT

Methods of estimating motion in image data include the steps of producing a first frame of image data from a received video signal containing information of an image data frame of higher predetermined resolution (e.g., 352× 244 pixels) and producing a second image data frame of coarser resolution (e.g., 88×61 pixels) relative to the first image data frame. An estimate of motion in the second image data frame is then produced and used to determine a estimate of motion in the first image data frame of higher resolution. The estimate of motion in the first image data frame is then used to obtain an estimate of motion in the received image data frame of predetermined full resolution. The estimate of motion in the second image data frame can be determined by reading a plurality of motion vectors from an image block in a previous version of the second image data frame and reading image data in a reference block in a current version of the second image data frame. To obtain this estimate, an optimum motion vector is determined by predicting a plurality of motion vectors based on a corresponding plurality of motion models and selecting the best model and vector which yields the smallest difference signal. Once an optimum motion vector has been predicted, the plurality of motion vectors previously read are adjusted relative to the optimum motion vector. Then a determination is made as to which one of the plurality of vectors yields the smallest relative motion error so that this vector can be used as an estimation of motion from the previous version of the second image data frame to the current version of the second image data frame. These steps are then performed again for the first image data frame of higher resolution.

21 Claims, 8 Drawing Sheets

METHODS OF ESTIMATING MOTION IN IMAGE DATA AND APPARATUS FOR PERFORMING SAME

FIELD OF THE INVENTION

The present invention relates to image data methods and apparatus, and more particularly to methods and apparatus for processing full motion image data.

BACKGROUND OF THE INVENTION

Video communication which is in widespread use can be classified generally into two categories including analog and digital image communication. Analog image communication has been used for video conferencing, for example, but is generally limited by poor resolution of the transmitted and received image data. In contrast, digital image communication of full motion image data generally has significantly improved fidelity relative to analog image communication in part because digital information can be generally transmitted and received in large quantities at higher data rates than analog image data.

As will be understood by those skilled in the art, to represent image data digitally, an image area or frame is typically made up of an array of pixels (e.g., 352 rows×244 lines) with a digital number representing the color, luminance and chrominance of each pixel. Pixel color information typically consists of three digital values including one digital value for red, one for green and one for blue. Thus, a large quantity of information is needed to describe a pixel which means that digital representations of complete image frames requires exceptionally large quantities of digital data. For example, memory capacity of about three million bytes is required to process color video of 1000×1000 pixels, which means that about ninety (90) million bytes of digital information must be processed every second if a dynamic full motion picture image of 30 frames per second is to be generated. In particular, in full motion video, not only are large blocks of data required to describe each individual picture image, but a new image or frame must be presented to the viewer at approximately thirty new images per second to create the appearance of continuous motion. Moving these large quantities of video image data across digital networks or phone lines is simply infeasible given available bandwidth.

To address this problem, digital data compression has be explored extensively as a technique for reducing the number of bits required to send a given message and have that message received and reproduced with sufficient fidelity. Data compression typically utilizes either a single shorthand notation to signal a repetitive string of bits or omits data bits from the transmitted message. This latter form of compression is typically referred to as "lossy" compression and capitalizes upon on the human mind to provide the omitted data. In still video, the JPEG standard is used for data compression and defines the method by which the still image is to be compressed. In motion video, much of the picture data remains constant from frame to frame. Therefore, the video data may be compressed by first describing a reference frame and describing subsequent frames in terms of the change from the reference frame.

Compression of digital data by performing motion estimation can also be accomplished by comparing video blocks within a previous image frame with video blocks within a present frame (both of which are created by pixel movement in the vertical and/or horizontal directions) and then finding the video block having the smallest difference signal. As will be understood by those skilled in the art, the difference signal can be obtained by determining a sum of absolute difference between blocks. Since it is difficult to compare each block in a large image with blocks from a previous frame, a search area having a predetermined size corresponding to each block is typically set for the previous frame. The motion vector is then determined by searching in the predetermined search area in the present frame. The smaller the size of the block, the more accurate the search for movement is. However, use of a smaller block size typically increases the size of the motion vectors because as the search area increases in size, the larger the movement can be which will be found in the search area and therefore the larger the motion vector.

Figure 1:
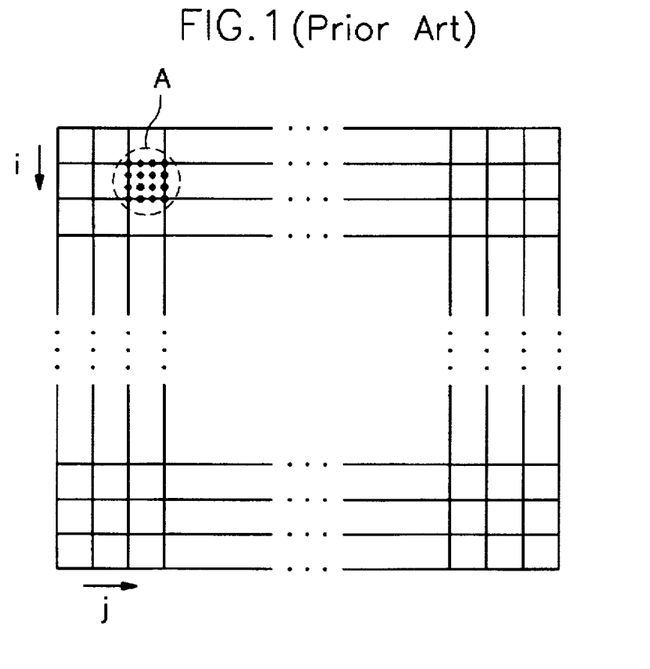
FIG. 1 illustrates a pictorial representation of a prior art 4×4 block matching method of motion estimation.

There are a number of methods for estimating motion. For example, there is the matching method, a gradient method and a block matching method. In particular, FIG. 1 illustrates a conventional 4×4 blocking matching method. Referring to FIG. 1, a screen can include 244 lines and 352 pixels per line which is an international standard for dynamic picture imaging for communication over telephone lines. Each pixel has a corresponding brightness and the brightness can be expressed digitally as a number in the range of 0–255 and motion on the screen can be estimated by evaluating a change in brightness of each pixel. Preferably, in searching motion, a block(s) of pixels is identified and motion is determined by searching according to a change in brightness of the block. This is achieved by assigning motion of a typical pixel in the block to motion of the block on the assumption that the block has only one motion. To illustrate, FIG. 1 illustrates a block of 4×4 or sixteen (16) pixels (Block A).

As will be understood by those skilled in the art, since the motion of the block is two-dimensional, it can be expressed by a two-dimensional motion vector according to Equation 1.

$$V(i,j) = \{V_x(i,j), V_y(i,j)\} \quad (1)$$

Figure 2:
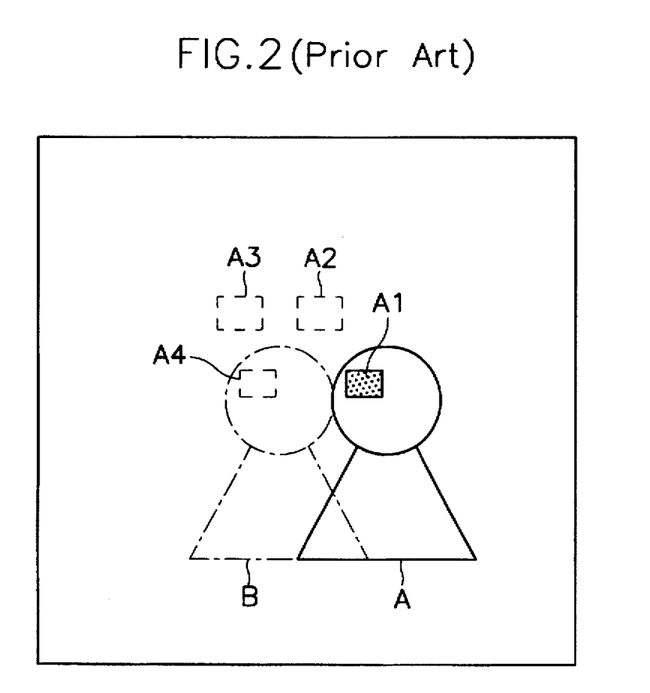
FIG. 2 illustrates a pictorial representation of a prior art full search method of motion estimation.
Figure 3:
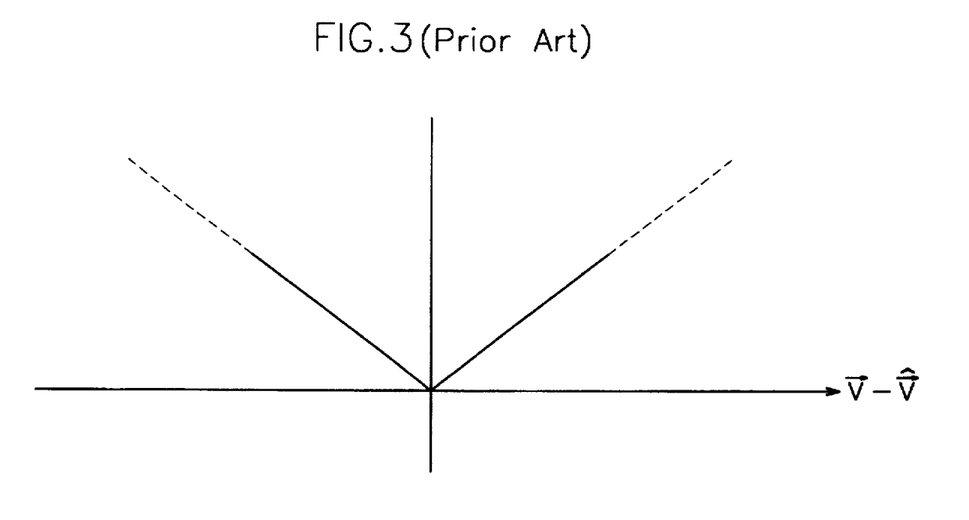
FIG. 3 illustrates a sum of absolute difference graph for a full search method of motion estimation.

In addition to the above methods for estimating motion, there is also a full search method, an M-step search method, a hierarchical search method and a predictive search method. The full search method, which is illustrated by FIG. 2, is the most typically used method for estimating motion. FIG. 3 also illustrates the characteristics of a conventional sum of absolute difference (SAD) graph in the full search method, as known to those skilled in the art. In particular, when a position of an object corresponds to A at the present time and corresponds to B at a just previous time, a block having the least SAD is determined according to the following equation and the brightness signal of the block is used to estimate the motion of the block A1 of the object, so that the position of the object is estimated based on the position of the block A1.

$$\sum_{x=0}^{N(m)-1} \sum_{y=0}^{M(m)-1} |I_t(x,y,m) - I_{t-1}(x - v_x(k), y(x - v_y(k), m)|$$

For example, when a search size for searching with the motion vector is the size of ±1 pixel, nine (9) SADs are obtained and a position having the least value among the nine SADs is used as an estimate of the position to which the object has moved. These nine SADs are: {V(x,y): (−1,1), (0,1), (1,1), (−1,0), (0,0), (1,0) (−1,−1), (0,−1), (1,−1)}. However, since the motion may not be properly estimated if the motion is beyond the search range of ±1 pixel, the search range is typically extended to the size of ±16 pixels but this significantly increases the number SADs that need to be checked for each of the possible motion vectors in the search range. Accordingly, while the full search method can be effective in dynamic image compression, the amount of calculation that is necessary to obtain an estimate can be excessive, so other search methods have been developed to address this limitation in the full search method. As mentioned above, these other methods include the M-step search method, the hierarchical search method and the predictive search method.

Figure 4A:
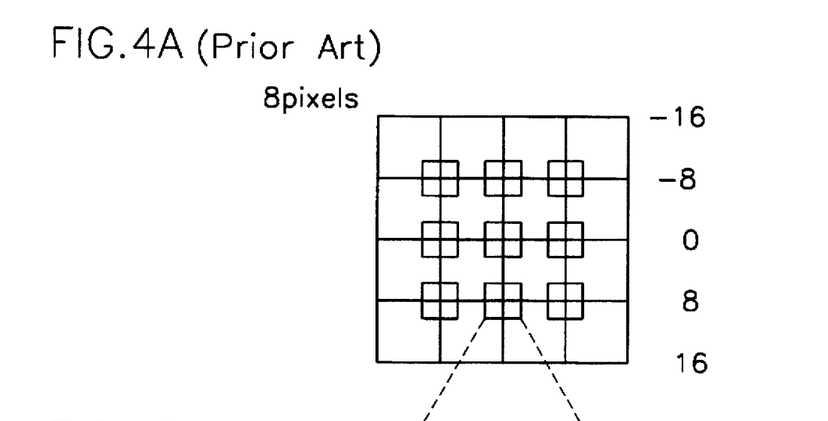
FIG. 4 illustrates a pictorial representation of a prior art 3-step search method of motion estimation.
Figure 4B:
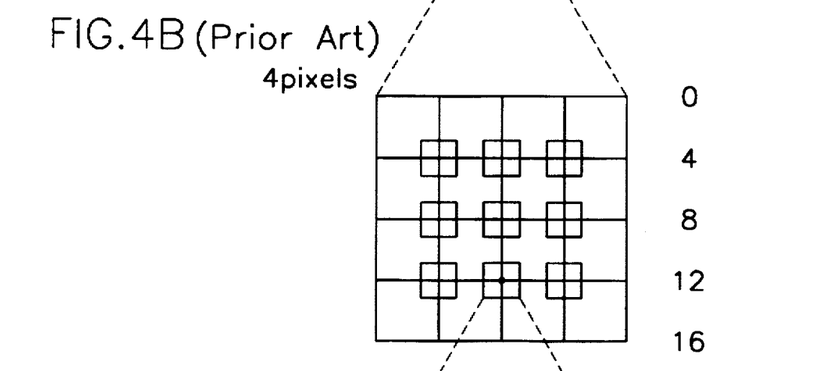
Figure 4C:
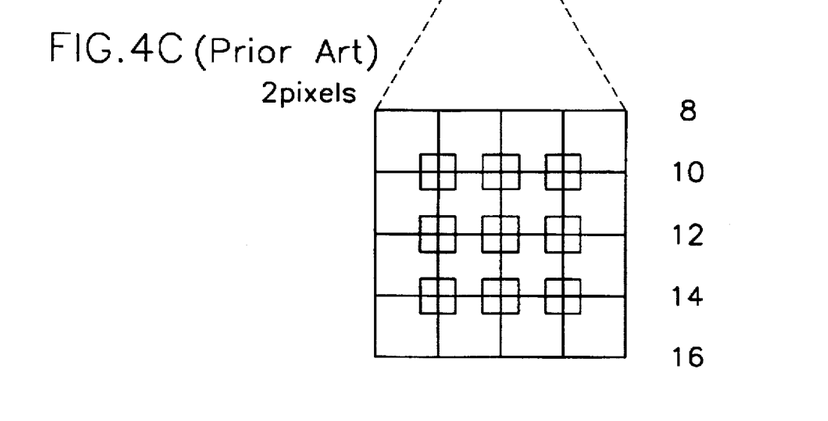
Figure 5:
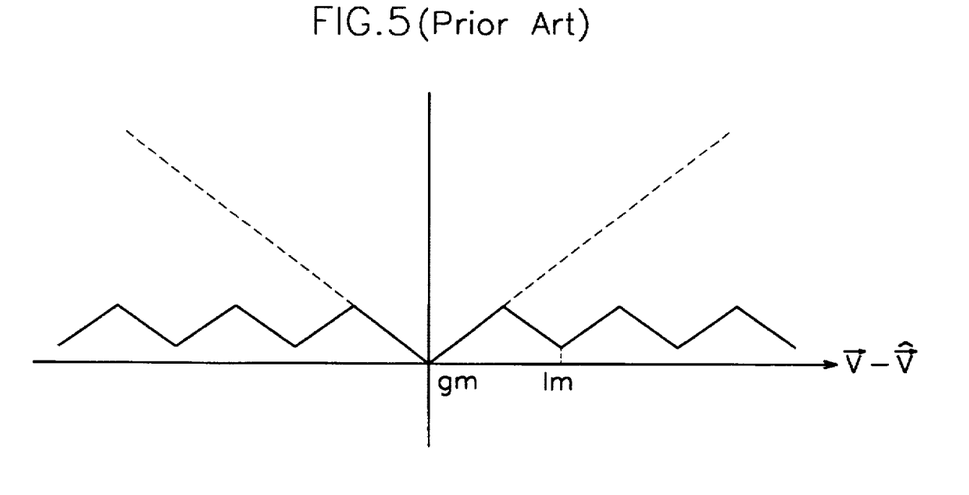
FIG. 5 illustrates a sum of absolute difference graph including local minimums ("lm") for a M-step search method of motion estimation.

Referring now to FIG. 4A–C, a prior art M-step search method is illustrated. In the M-step search method, motion is estimated by searching with an accuracy of $2^{(M-1)}$ pels and the outskirts of the searched motion are again searched with an accuracy of $2^{(M-2)}$ pels, and then these operations are repeated. For example, when the M-step method is a 3-step method, motion is estimated first by forming the size of the block in 8 pixels as illustrated in FIG. 4A, and next the motion is estimated by forming the size of the block in 4 pixels as illustrated in FIG. 4B. Next, the motion is estimated by forming the size of the block in 2 pixels as illustrated in FIG. 4C. Accordingly, the motion can be estimated by dividing an estimation step into a series of steps and then gradually estimating the motion in greater detail to achieve a final estimate. Unfortunately, the M-step method has a disadvantage in that if the motion is estimated in error in one step, the motion search may be collected to a local minimum ("lm") as illustrated by FIG. 5.

In the case of a hierarchical search method, option can be searched in a coarser resolution image of 88×61 pixels, which is a reduction from a full resolution image of 352×244 pixels, and then motion is again searched in a finer resolution image of 176×122 pixels which enlarges the outskirts of the searched motion to a greater degree. Thus, if motion is searched in the size of 4 pixels in the least finer image, it has an effect of searching the motion in the size of 16 pixels in the full resolution image. Then, the motion can be estimated by searching in the size of 2 pixels in the next finer resolution image which has the effect of searching motion in the size of 4 pixels in the full resolution image. As will be understood by those skilled in the art, these steps minimize the amount of calculation necessary to estimate motion in the full resolution image. Unfortunately, the hierarchical search method has a disadvantage in that if the motion is estimated in error in the coarser resolution image, the motion search may be collected to a local minimum point ("lm").

In the predictive search method, motion in the reference block to be searched is predicted from the motion of circumferential blocks and the outskirts around a prediction value are searched. However, the predictive search method has a disadvantage in that if the prediction value is not accurate, the motion search may be collected to a local minimum point ("lm").

In the above described methods, a motion vector field is used as a prediction model and a 2-D spatial model and 3-D spatial model based on a coarser resolution image are also used. In the 3-D spatial model, the motion in the current reference block is effectively predicted by effectively combining information about the motion vector field in the coarser resolution image and information about the motion vector field in the circumferential blocks. The 3-D spatial model also includes multiple elementary models to effectively treat motion discontinuity. The 3-D spatial model is more fully described in a doctoral dissertation entitled "3-D Kalman Filter for Video and Motion Estimation", by coinventor Jae-Min Kim, Rensselear Polytechnic Institute (1994), the disclosure of which is hereby incorporated herein by reference. However, the 3-D spatial model has disadvantages in that the model parameter set is very complex and because it is difficult to implement the motion estimation since the algorithm is complex as well and the amount of necessary calculation is large when a Kalman filter is used to estimate motion.

Thus, notwithstanding the above described methods of estimating motion in image data, there still continues to be a need for methods and apparatus for efficiently processing full motion image data in compressed format with reduced error.

SUMMARY OF THE INVENTION

It is therefore an object of the present invention to provide improved methods and apparatus for processing full motion image data.

It is further object of the present invention to provide methods and apparatus for processing full motion image data in compressed format with reduced error.

It is another object of the present invention to provide methods and apparatus for processing and communicating full motion image data using reduced bandwidth.

These and other objects, features and advantages of the present invention are provided by methods and apparatus for estimating motion in video data so that efficient communication of video data in real time with high fidelity is feasible. Using this method, full motion image data is processed in 3-dimensions using multiple models and by adjusting a search region based on prediction errors from the models to more accurately estimate motion. In particular, according to a preferred embodiment of the present invention, a step is performed to produce a first frame of image data from a received video signal containing information describing an image data frame of predetermined resolution (e.g., 352× 244 pixels). However, the first frame of image data is of coarser resolution (e.g., 176×122 pixels) relative to the image data frame of predetermined resolution. In addition, a second image data frame of coarser resolution (e.g., 88×61 pixels) relative to the first image data frame is also produced so that a more efficient routine for detecting motion can be achieved using 3-dimensional processing.

Once the images of reduced resolution have been produced, an estimate of motion in the second image data frame is then produced and used in the estimation of motion in the first image data frame of higher resolution. The estimation of motion in the first image data frame is then used to obtain an estimation of motion in the image data frame of predetermined resolution. In particular, an estimate of motion in the second image data frame, for example, can be determined by reading a plurality of motion vectors (e.g. nine for a search size of ±1 pixel) from an image block in a previous version of the second image data frame and reading image data in a reference block in a current version of the second image data frame. An optimum motion vector is also determined by predicting a plurality of motion vectors based on a corresponding plurality of motion models and selecting the best model and vector which yields the smallest sum of absolute difference error. Once an optimum motion vector has been predicted, the plurality of motion vectors previously read are adjusted relative to the optimum motion vector and then a determination is made as to which vector yields the smallest relative motion error so that this vector can be used as an estimation of motion from the previous version of the second image data frame to the current version of the second image data frame. These steps are then performed again for the first image data frame of higher resolution, using the estimation obtained from the second image data frame, and then performed again so that a highly accurate estimation of motion in the image data frame of predetermined resolution can be achieved. The present invention also includes apparatus for performing the above described operations.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like number refer to like elements throughout.

Figure 6:
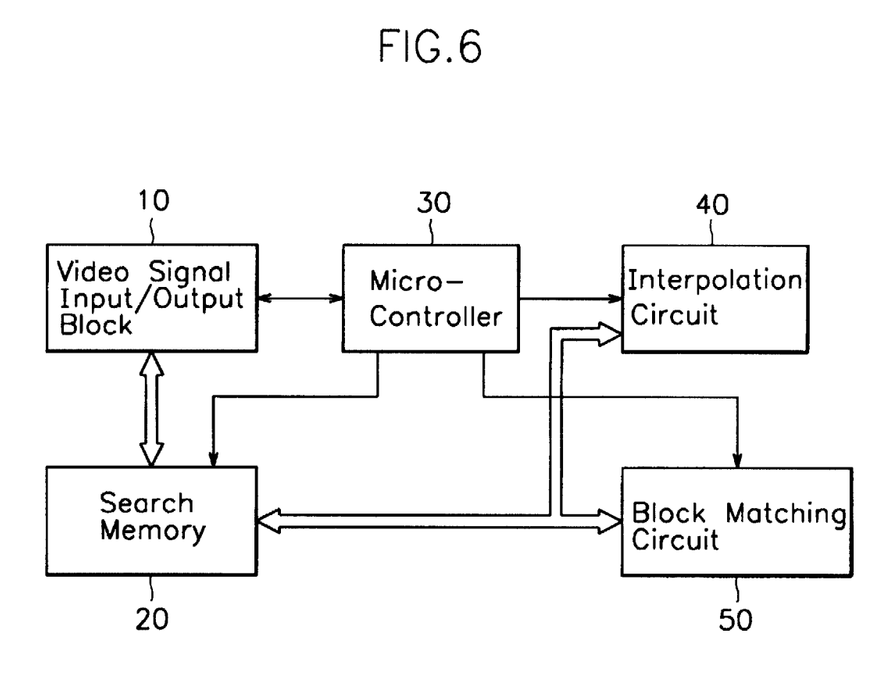
FIG. 6 is a block diagram illustrating an apparatus for performing motion estimation according to the present invention.

Referring now to FIGS. 6-10, the present invention will be described. In particular, FIG. 6 illustrates a preferred hardware configuration for an apparatus for estimating motion in image data according to the present invention. The apparatus may include an input/output unit 10 for receiving an external video signal containing image data and transmitting an estimated motion signal determined by the operations described herein. A search memory 20 is also provided for storing the received external video signal and results obtained during intermediate stages of the preferred operations for performing motion estimation according to the present invention. A microcontroller 30 is also provided for producing, among other things, image data frames of multiple resolution relative to an image data frame of predetermined full resolution and a signal representing an estimate of motion in the received image data. A block matching circuit 50, which is responsive to the microcontroller 30, is provided for performing block matching of data preferably stored in the search memory 20. In addition, an interpolation circuit 40 for interpolating a value of the data stored in the search memory 20 in response to a signal from the microcontroller 30 and producing an interpolated signal, is provided.

Information of a general nature relating to other apparatus for performing motion estimation can be found in U.S. Pat. Nos. 5,365,281, entitled *Motion Signal Detecting Circuit*; 5,392,073 entitled *Motion Estimating Device For Variable Length Encoded Data*; 5,467,086 entitled *Apparatus and Method of Coding/Decoding Video Data*; 5,489,949 entitled *Method and Apparatus for Motion Estimation*; 5,497,153 entitled *System for Variable-Length-Coding and Variable-Length-Decoding Digital Data for Compressing Transmission Data*; 5,493,344 entitled *Motion Vector Estimation Method and Apparatus Having Half-Pixel Accuracy*; 5,508,745 entitled *Apparatus for Controlling A Quantization Level to be Modified by a Motion Vector*; and 5,510,857 entitled *Motion Estimation Coprocessor*, all of which are assigned to the assignee of the present application and hereby incorporated herein by reference.

Figure 7:
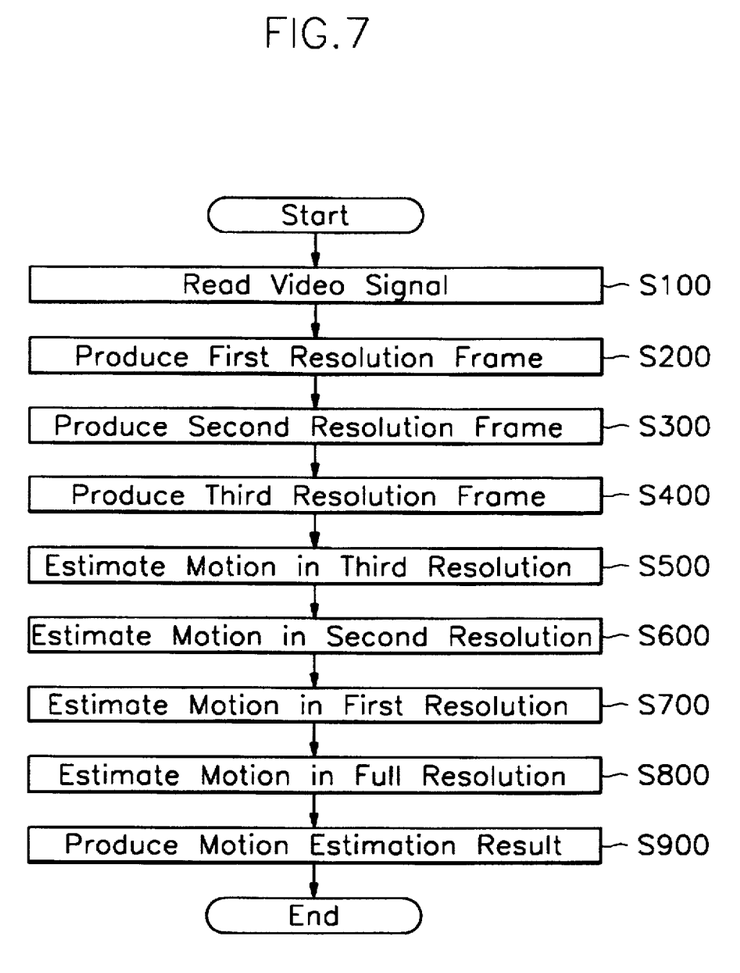
FIG. 7 is a flow chart illustrating operations for estimating motion in image data according to an embodiment of the present invention.

Referring now to operations S100–S900 of FIG. 7, the microcontroller 30 reads the external video signal received by the input/output unit 10, operation S100. This signal contains information to construct an image data frame of predetermined full resolution (e.g., 352×244 pixels). Referring now to operation S200, the microcontroller 30 performs the operation of producing a first image data frame from the image data frame of predetermined resolution, so that the first image data frame is of coarser resolution (e.g., 176×122 pixels), as illustrated best by FIG. 10. This operation is then followed by a step of storing information relating to the first image data frame in the search memory 20. In operation S300, a second image data frame is produced so that the second image data frame is of coarser resolution (e.g., 88×61 pixels) relative to the first image data frame and then this frame is stored in search memory 20. Next, in operation S400, a third image data frame is produced so that the third image data frame is of coarser resolution (e.g., 44×30.5 pixels) relative to the second image data frame and then this frame is also stored in search memory 20.

Referring still to FIG. 7, the microcontroller 30 then estimates motion after a predetermined amount of time from the third image data frame to obtain a first estimation, as illustrated by operation S500. This first estimation is then stored in search memory 20. Next, the microcontroller 30 estimates motion from the second image data frame on the basis of the motion estimated in operation S500, to obtain a second estimation which is then stored in search memory 20, as illustrated by operation S600. Following this step, the microcontroller 30 estimates motion from the first image data frame on the basis of the motion estimated in operation S600, to obtain a third estimation which is stored, as illustrated by operation S700. Finally, the microcontroller 30 estimates motion in the image data frame of predetermined full resolution on the basis of the motion estimated in operation S700 and then this estimate is stored, as illustrated by operation S800. The microcontroller 30 then causes the production of a video signal containing the motion estimation corresponding to the full resolution image data frame for transmission by the input/output unit 10, operation S900.

Figure 8:
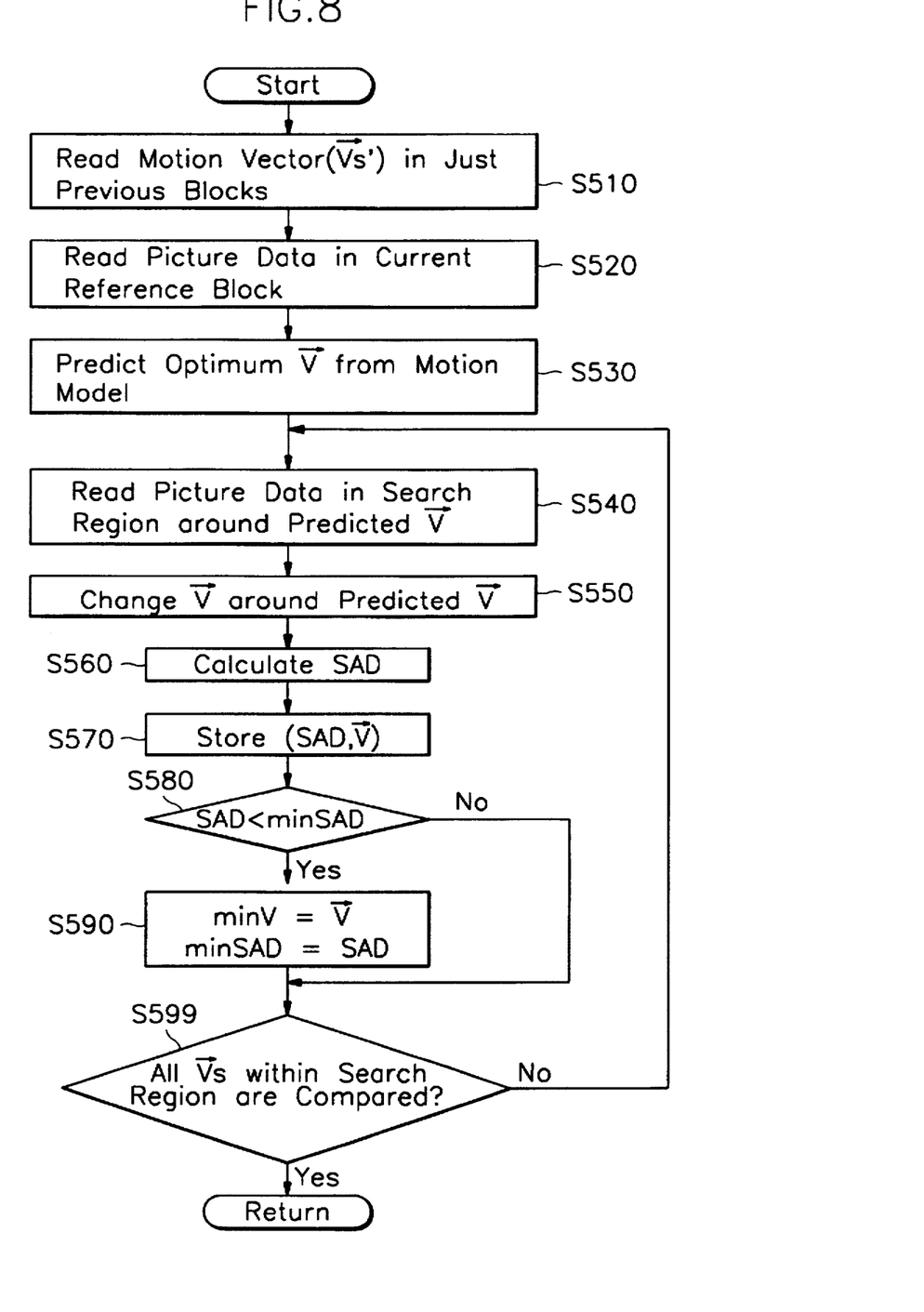
FIG. 8 is a flow chart illustrating operations for estimating motion in an image data frame of full or relatively coarse resolution.

Referring now to FIG. 8, the operation S500 for estimating motion in the third data frame to obtain an estimation of motion will be described, however the steps performed by this preferred operation are also applicable to operations S600–S800. In operation S500, the microcontroller 30 reads the motion vectors ($V_S$) of the blocks from a just previous image data frame (S510) and reads image data in a reference block in a current image data frame (S520). During operation S500, a optimum motion vector is also predicted from a motion model (S530) and then image data in a search region within the current image data frame and around the predicted motion vector, is read (S540). This reading step (S540) is then followed by the step S550 of adjusting or changing the motion vectors obtained from (S510), around or relative to the predicted motion vector obtained from (S530).

As illustrated by steps S560–S599, a sum of absolute difference (SAD) between the reference block and block of image data at an adjusted motion vector is determined for each of the adjusted motion vectors obtained from (S550) and the lowest determined SAD and the adjusted motion vector yielding the lowest determined SAD are stored in memory, for use during subsequent operations.

Figure 9:
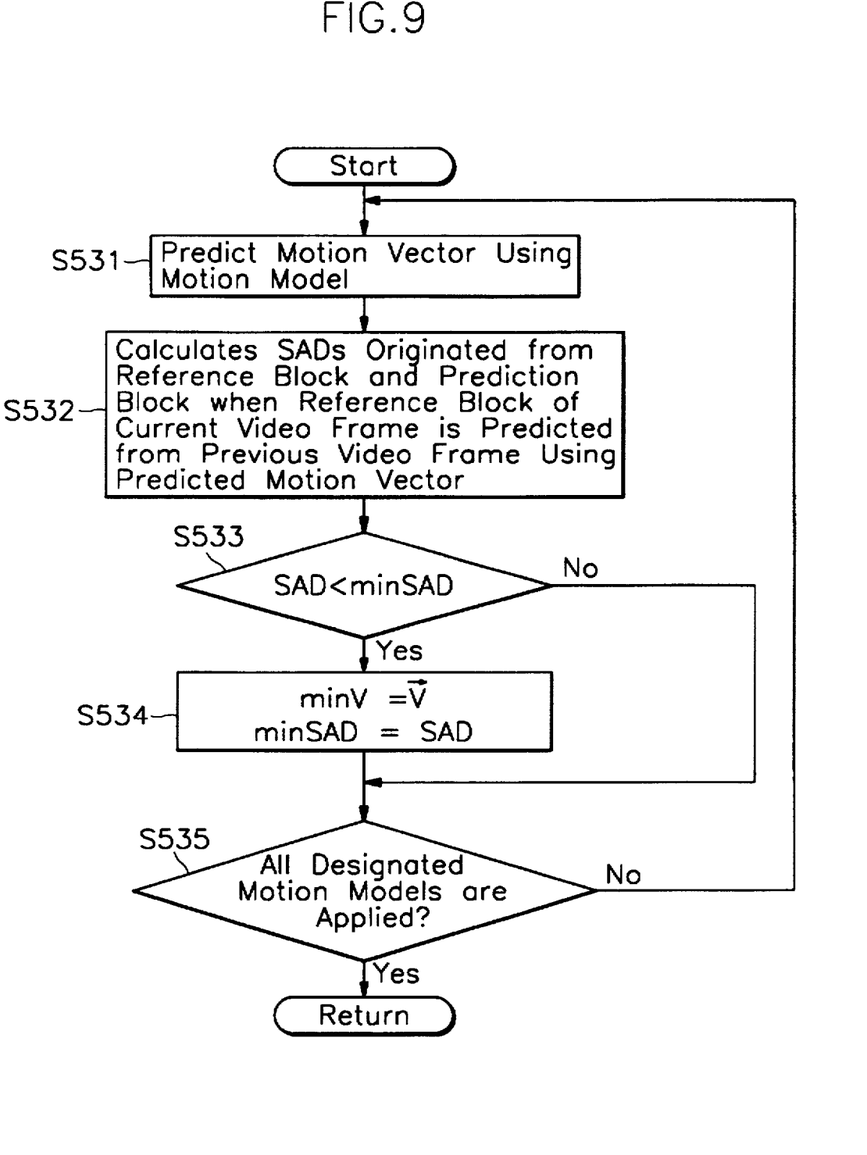
FIG. 9 is a flow chart illustrating operations for predicting an optimum motion vector based on a plurality of models.
Figure 10:
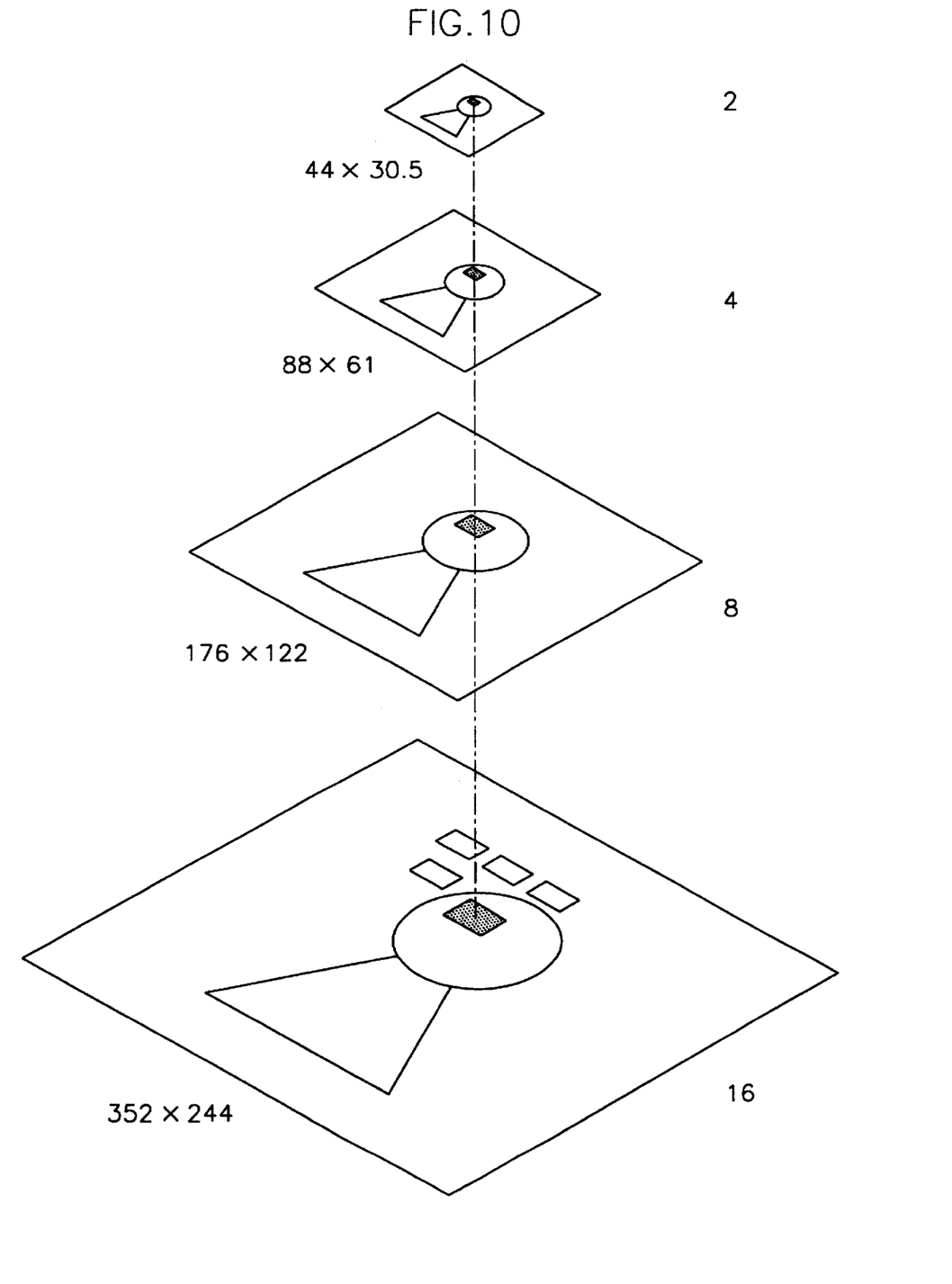
FIG. 10 illustrates a pictorial representation showing the full, first, second and third resolution frames used to determine a motion estimation according to the present invention.

Referring now to FIG. 9, the operation S530 for predicting an optimum motion vector according to the present invention will be described. Using this operation S530, the search region can be preferably adjusted based on prediction errors derived by analyzing multiple motion models and minimizing these errors by using a feedback loop to determine the best model to most accurately estimate motion using the steps of FIG. 8. In particular, at step S531, a motion vector is predicted using a first motion model and then at step S532, a sum of absolute difference is determined between a reference block and a prediction block when the reference block of a current frame is predicted from a previous video frame using the predicted motion vector based on the first motion model. However, rather than using only one model, a plurality of different models are used to reduce the likelihood of occurrence of a local minimum ("lm") in the difference graph of FIG. 5, which can be problematic using the methods of the prior art. For example, steps S533–S535 illustrate that the model yielding the motion vector corresponding to the lowest SAD, when step S532 is performed, will provide an optimum motion vector to be used in step S530.

As illustrated below with respect to Table 1, when compared to the full search method and hierarchical search method described in the background section of the present application, the present invention is preferable to both methods based on the average value of the mean square error (MSE) of temporal interpolation in thirty (30) frames, when a flower garden sequence and mobile sequence are used.

TABLE 1

|  | Flower Garden Sequence | Mobile Sequence |
| --- | --- | --- |
| Full Search | 278 | 361 |
| Hierarchical Search | 282 | 273 |
| Present Invention | 232 | 239 |

In addition, Table 2 illustrates average values of the mean square error (MSE) of motion compensated prediction in thirty (30) frames, using the above search methods. Based on the MSE of motion compensated prediction, the full search method is the most effective, but the method according to the present invention is almost as good as the full search method.

TABLE 2

|  | Flower Garden Seguence | Mobile Sequence |
| --- | --- | --- |
| Full Search | 226 | 296 |
| Hierarchical Search | 338 | 372 |
| Present Invention | 245 | 303 |

Referring now to Table 3, the times needed to calculate the final motion estimation by each method is illustrated. Based on time, the hierarchical search method is the most effective, but the method according to the present invention is almost as efficient based on time.

TABLE 3

|  | Flower Garden Sequence | Mobile Sequence |
| --- | --- | --- |
| Full Search | 105 sec. | 105 sec. |
| Hierarchical Search | 6.3 sec. | 6.3 sec. |
| Present Invention | 6.5 sec. | 6.5 sec. |

As described above, the microcontroller 30, in conjunction with the other structural elements of FIG. 6, is preferably designed to perform the above operations of FIGS. 7–9. Accordingly, an apparatus for compressing motion video data by motion estimation according to the present invention includes means for receiving a video signal containing information to construct an image data frame of predetermined resolution; means, coupled to said receiving means, for producing information to construct a first image data frame of coarser resolution relative to the image data frame of predetermined resolution and information to construct a second image data frame of coarser resolution relative to the first image data frame; means, coupled to said information producing means, for estimating motion in the second image data frame to obtain a first estimation and for estimating motion in the first image data frame, based on the first estimation, to obtain a second estimation; and means, responsive to said estimating means, for transmitting a video signal containing an estimate of motion occurring in the image data frame of predetermined resolution, based on the second estimation.

According to the present invention, the apparatus for estimating motion preferably includes means for reading a plurality of motion vectors and reading image data in a reference block in the second image data frame; means for predicting an optimum motion vector based on a motion model; means, responsive to said reading means and predicting means, for reading image data in a first search region in the second image data frame, adjacent the predicted optimum motion vector; means for adjusting one of said plurality of motion vectors relative to the predicted optimum motion vector, to obtain a first motion vector; and means, responsive to said adjusting means, for determining a first sum of absolute difference between the reference block and a block of image data at the first motion vector.

Finally, the apparatus for predicting an optimum motion vector preferably includes means for predicting a motion vector using a first model; means for determining a sum of absolute difference between a reference block and a prediction block in the second image data frame when the reference block is predicted from a previous image data frame using the predicted motion vector based on the first model;

means for predicting a motion vector using a second model; means for determining a sum of absolute difference between a reference block and a prediction block in the second image data frame when the reference block is predicted from a previous image data frame using the predicted motion vector based on the second model; and means, responsive to said predicting and determining means, for determining the predicted motion vector based on the first model as an optimum motion vector, if the sum of absolute difference determined using the predicted motion vector based on the first model is less than the sum of absolute difference determined using the predicted motion vector based on the second model.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of estimating motion in image data, comprising the steps of:
   producing a first image data frame from an image data frame of first resolution, so that the first image data frame is of reduced resolution relative to the image data frame of first resolution;
   producing a second image data frame from the image data frame of first resolution or the first image data frame, so that the second image data frame is of reduced resolution relative to the first image data frame;
   estimating motion in the second image data frame to obtain a first estimation, by:
      predicting a motion vector based on a motion model;
      reading image data in a first search region within the second image data frame, based on the predicted motion vector;
      determining a first motion vector based on the predicted motion vector; and
      determining a sum of absolute difference based on the first motion vector,
   estimating motion in the first image data frame based on the first estimation, to obtain a second estimation; and
   estimating motion in the image data frame of first resolution based on the second estimation.

2. A method of estimating motion in image data, comprising the steps of:
   producing a first image data frame from an image data frame of first resolution, so that the first image data frame is of reduced resolution relative to the image data frame of first resolution;
   producing a second image data frame from the image data frame of first resolution or the first image data frame, so that the second image data frame is of reduced resolution relative to the first image data frame;
   estimating motion in the second image data frame to obtain a first estimation, by:
      reading a plurality of motion vectors;
      reading image data in a reference block in the second image data frame;
      predicting an optimum motion vector based on a motion model;
      reading image data in a first search region adjacent the predicted optimum motion vector;
      adjusting one of said plurality of motion vectors relative to the predicted optimum motion vector, to obtain a first motion vector; and
      determining a first sum of absolute difference between the reference block and a block of image data at the first motion vector,
   estimating motion in the first image data frame based on the first estimation, to obtain a second estimation; and
   estimating motion in the image data frame of first resolution based on the second estimation.

3. The method of claim 2, wherein said step of reading image data in a first search region adjacent the predicted optimum motion vector comprises reading image data in a first search region surrounding the predicted optimum motion vector.

4. The method of claim 2, further comprising the steps of:
   adjusting another of said plurality of motion vectors relative to the predicted optimum motion vector, to obtain a second motion vector;
   determining a second sum of absolute difference between the reference block and a block of image data at the second motion vector; and
   determining the first motion vector as an estimate of motion in the second image data frame instead of the second motion vector, if the first sum of absolute difference is less than the second sum of absolute difference.

5. The method of claim 2, wherein said step of predicting an optimum motion vector based on a motion model comprises the steps of:
   predicting a motion vector using a model; and
   determining a sum of absolute difference between a reference block and a prediction block in the second image data frame when the reference block is predicted from a previous image data frame using the predicted motion vector.

6. The method of claim 5, wherein said step of predicting a motion vector using a model comprises predicting a plurality of motion vectors using a corresponding plurality of models.

7. The method of claim 6, further comprising the steps of determining a plurality of sums of absolute difference between the reference block and a plurality of prediction blocks in the second image data frame which are determined from the reference block and corresponding ones of the plurality of motion vectors.

8. The method of claim 7, further comprising the step of determining the lowest value of the plurality sums of absolute difference.

9. The method of claim 2, wherein said step of predicting an optimum motion vector based on a motion model comprises the steps of:
   predicting a motion vector using a first model;
   determining a sum of absolute difference between a reference block and a prediction block in the second image data frame when the reference block is predicted from a previous image data frame using the predicted motion vector based on the first model;
   predicting a motion vector using a second model;
   determining a sum of absolute difference between a reference block and a prediction block in the second image data frame when the reference block is predicted from a previous image data frame using the predicted motion vector based on the second model; and
   determining the predicted motion vector based on the first model as an optimum motion vector, if the sum of absolute difference determined using the predicted motion vector based on the first model is less than the sum of absolute difference determined using the predicted motion vector based on the second model.

10. A method of estimating motion in image data, comprising the steps of:

producing a first image data frame from an image data frame of first resolution, so that the first image data frame is of reduced resolution relative to the image data frame of first resolution;

producing a second image data frame from the image data frame of first resolution or the first image data frame, so that the second image data frame is of reduced resolution relative to the first image data frame;

producing a third image data frame from the image data frame of first resolution, the first image data frame or the second image data frame, so that the third image data frame is of reduced resolution relative to the second image data frame;

estimating motion in the third image data frame to obtain a first estimation, by:
 predicting a motion vector based on a motion model;
 reading image data in a first search region within the third image data frame, based on the predicted motion vector;
 determining a first motion vector based on the predicted motion vector; and
 determining a sum of absolute difference based on the first motion vector;

estimating motion in the second image data frame based on the first estimation, to obtain a second estimation;

estimating motion in the first image data frame based on the second estimation, to obtain a third estimation; and estimating motion in the image data frame of first resolution based on the third estimation.

11. A method of estimating motion in image data, comprising the steps of:

producing a first image data frame from an image data frame of first resolution, so that the first image data frame is of reduced resolution relative to the image data frame of first resolution;

producing a second image data frame from the image data frame of first resolution or the first image data frame, so that the second image data frame is of reduced resolution relative to the first image data frame;

producing a third image data frame from the image data frame of first resolution, the first image data frame or the second image data frame, so that the third image data frame is of reduced resolution relative to the second image data frame;

estimating motion in the third image data frame to obtain a first estimation, by:
 reading a plurality of motion vectors;
 reading image data in a reference block in the third image data frame;
 predicting an optimum motion vector based on a motion model;
 reading image data in a first search region adjacent the predicted optimum motion vector;
 adjusting one of said plurality of motion vectors relative to the predicted optimum motion vector, to obtain a first motion vector; and
 determining a first sum of absolute difference between the reference block and a block of image data at the first motion vector;

estimating motion in the second image data frame based on the first estimation, to obtain a second estimation;

estimating motion in the first image data frame based on the second estimation, to obtain a third estimation; and estimating motion in the image data frame of first resolution based on the third estimation.

12. The method of claim 11, wherein said step of reading image data in a first search region adjacent the predicted optimum motion vector comprises reading image data in a first search region surrounding the predicted optimum motion vector.

13. The method of claim 11, further comprising the steps of:

adjusting another of said plurality of motion vectors relative to the predicted optimum motion vector, to obtain a second motion vector;

determining a second sum of absolute difference between the reference block and a block of image data at the second motion vector; and determining the first motion vector as an estimate of motion in the third image data frame instead of the second motion vector, if the first sum of absolute difference is less than the second sum of absolute difference.

14. The method of claim 11, wherein said step of predicting an optimum motion vector based on a motion model comprises the steps of:

predicting a motion vector using a model; and determining a sum of absolute difference between a reference block and a prediction block in the third image data frame when the reference block is predicted from a previous image data frame using the predicted motion vector.

15. The method of claim 14, wherein said step of predicting a motion vector using a model comprises predicting a plurality of motion vectors using a corresponding plurality of models.

16. The method of claim 15, further comprising the steps of determining a plurality of sums of absolute difference between the reference block and a plurality of prediction blocks in the third image data frame which are determined from the reference block and corresponding ones of the plurality of motion vectors.

17. The method of claim 16, further comprising the step of determining the lowest value of the plurality sums of absolute difference.

18. The method of claim 11, wherein said step of predicting an optimum motion vector based on a motion model comprises the steps of:

predicting a motion vector using a first model;

determining a sum of absolute difference between a reference block and a prediction block in the third image data frame when the reference block is predicted from a previous image data frame using the predicted motion vector based on the first model;

predicting a motion vector using a second model;

determining a sum of absolute difference between a reference block and a prediction block in the third image data frame when the reference block is predicted from a previous image data frame using the predicted motion vector based on the second model; and determining the predicted motion vector based on the first model as an optimum motion vector, if the sum of absolute difference determined using the predicted motion vector based on the first model is less than the sum of absolute difference determined using the predicted motion vector based on the second model.

19. An apparatus for compressing motion video data by performing motion estimation, comprising:

means for receiving a video signal containing information to construct an image data frame of first resolution;

means, coupled to said receiving means, for producing information to construct a first image data frame of reduced resolution relative to the image data frame of first resolution and information to construct a second image data frame of reduced resolution relative to the first image data frame;

means, coupled to said information producing means, for estimating motion in the second image data frame to obtain a first estimation and for estimating motion in the first image data frame, based on the first estimation, to obtain a second estimation, said estimating means comprising:

means for reading a plurality of motion vectors and reading image data in a reference block in the second image data frame;

means for predicting an optimum motion vector based on a motion model;

means, responsive to said reading means and predicting means, for reading image data in a first search region in the second image data frame, adjacent the predicted optimum motion vector;

means for adjusting one of said plurality of motion vectors relative to the predicted optimum motion vector, to obtain a first motion vector; and means, responsive to said adjusting means, for determining a first sum of absolute difference between the reference block and a block of image data at the first motion vector; and means responsive to said estimating means, for transmitting a video signal containing an estimate of motion occurring in the image data frame of first resolution, based on the second estimation.

20. The apparatus of claim 19, wherein said means for predicting an optimum motion vector comprises:

means for predicting a motion vector using a model; and means for determining a sum of absolute difference between a reference block and a prediction block in the second image data frame when the reference block is predicted from a previous image data frame using the predicted motion vector.

21. The apparatus of claim 19, wherein said means for predicting an optimum motion vector comprises:

means for predicting a motion vector using a first model;

means for determining a sum of absolute difference between a reference block and a prediction block in the second image data frame when the reference block is predicted from a previous image data frame using the predicted motion vector based on the first model;

means for predicting a motion vector using a second model;

means for determining a sum of absolute difference between a reference block and a prediction block in the second image data frame when the reference block is predicted from a previous image data frame using the predicted motion vector based on the second model; and means, responsive to said predicting and determining means, for determining the predicted motion vector based on the first model as an optimum motion vector, if the sum of absolute difference determined using the predicted motion vector based on the first model is less than the sum of absolute difference determined using the predicted motion vector based on the second model.

* * * * *